United States Patent
Weber

(10) Patent No.: US 7,447,347 B2
(45) Date of Patent: Nov. 4, 2008

(54) METHOD AND SYSTEM FOR RETAINING MICR CODE FORMAT

(75) Inventor: Christopher S. Weber, Arlington, TX (US)

(73) Assignee: VECTORsgi, Inc., Addison, TX (US)

( * ) Notice: Subject to any disclaimer, the term of this patent is extended or adjusted under 35 U.S.C. 154(b) by 650 days.

(21) Appl. No.: 11/060,655

(22) Filed: Feb. 17, 2005

(65) Prior Publication Data

US 2006/0182332 A1    Aug. 17, 2006

(51) Int. Cl.
*G06K 9/00* (2006.01)
(52) U.S. Cl. ............................. 382/139; 382/306
(58) Field of Classification Search ............. 382/137, 382/139, 140, 305, 306, 318, 320
See application file for complete search history.

(56) References Cited

U.S. PATENT DOCUMENTS

| | | | |
|---|---|---|---|
| 4,797,938 A | 1/1989 | Will | 382/7 |
| 4,888,812 A * | 12/1989 | Dinan et al. | 382/7 |
| 5,265,007 A | 11/1993 | Barnhard, Jr. et al. | 364/408 |
| 5,583,759 A | 12/1996 | Geer | 395/245 |
| 5,631,984 A | 5/1997 | Graf et al. | 382/317 |
| 5,687,250 A | 11/1997 | Curley et al. | 382/112 |
| 5,717,868 A | 2/1998 | James | 395/235 |
| 5,910,988 A | 6/1999 | Ballard | 380/24 |
| 5,917,965 A | 6/1999 | Cahill et al. | 382/305 |
| 5,930,778 A | 7/1999 | Geer | 705/45 |
| 6,032,137 A | 2/2000 | Ballard | 705/75 |
| 6,181,837 B1 | 1/2001 | Cahill et al. | 382/305 |
| 6,243,504 B1 | 6/2001 | Kruppa | 382/318 |
| 6,574,377 B1 | 6/2003 | Cahill et al. | 382/305 |
| 6,591,009 B1 | 7/2003 | Usami et al. | 382/165 |
| 6,654,487 B1 | 11/2003 | Downs, Jr. | 382/139 |
| 6,782,144 B2 | 8/2004 | Bellavita et al. | 382/310 |
| 6,807,285 B1 | 10/2004 | Iwamura | 382/100 |
| 6,816,608 B2 | 11/2004 | Cato | 382/138 |
| 6,863,214 B2 * | 3/2005 | Garner, IV et al. | 382/137 |
| 7,066,669 B2 * | 6/2006 | Lugg | 400/578 |
| 2001/0022849 A1 | 9/2001 | Simonoff | 382/139 |
| 2002/0051562 A1 * | 5/2002 | Sheppard et al. | 382/137 |
| 2003/0156733 A1 | 8/2003 | Zeller et al. | 382/100 |
| 2003/0161523 A1 | 8/2003 | Moon et al. | 382/139 |
| 2004/0131224 A1 | 7/2004 | Tanaka | 382/100 |
| 2004/0263911 A1 | 12/2004 | Rodriguez et al. | 358/3.28 |
| 2005/0071283 A1 | 3/2005 | Randle et al. | 705/75 |
| 2005/0129300 A1 * | 6/2005 | Sandison et al. | 382/137 |

(Continued)

OTHER PUBLICATIONS

TIFF™, Revision 6.0, Adobe Developers Association, Jun. 03, 1992, pp. 1-121.

(Continued)

*Primary Examiner*—Andrew W Johns
(74) *Attorney, Agent, or Firm*—Fish & Richardson P.C.

(57) ABSTRACT

An image capture system for retaining Magnetic Ink Character Recognition (MICR) code format comprises a camera operable to generate an electronic check image of a physical check, with the electronic check image operable to generate an image replacement document. The image capture system further comprises a scanner operable to identify MICR code data from the physical check and one or more processors. The one or more processors are operable to embed the identified MICR code data in the electronic check image, with the embedded MICR code data in the original format.

22 Claims, 3 Drawing Sheets

U.S. PATENT DOCUMENTS

2005/0281448 A1* 12/2005 Lugg .......................... 382/139

OTHER PUBLICATIONS

"*Specifications for Electronic Exchange of Check and Image Data*," Financial Services Draft Standard for Trial Use, DSTU X9.37-2003, Accredited Standards Committee X9, Inc., Jan. 21, 2003, 162 pages.

International Search Report and Written Opinion of the International Searching Authority issued in related International Application No. PCT/US2006/004869; Jul. 24, 2006; 12 pages.

Notification Concerning Transmittal of Copy of International Preliminary Report on Patentability and International Preliminary Report on Patentability under Chapter I issued on Aug. 30, 2007 in International Application No. PCT/US2006/004869; 8 pages.

* cited by examiner

*FIG. 3A* (FRONT, 300a)

- 302: check image with:
  - JOHN SMITH, 123 MAPLE, DALLAS, TX 75214
  - No. 101
  - Date: Jan 1, 2000
  - Pay to the Order of: ABC Corp.
  - $100.00
  - One hundred and none DOLLARS
  - ABC Bank, YOUR CITY, STATE 12345
  - MEMO
  - Signature: John Smith
  - ⑈:000012345⑈: 12345678⑈" 0101
  - 304
- 306: IRD
  - *011500120*
  - 01/02/2000
  - 8587408979
  - This is a LEGAL COPY of your check. You can use it the same way you would use the original check.
  - 7815830233
  - [031000011] 01/02/2000

*FIG. 3B* (BACK, 300b)

011500120  01/02/2000
8587408979

→ Do not endorse or write below this line.

ENDORSE HERE

X    FOR DEPOSIT ONLY
        ABC BANK
        ACCOUNT 123456789
        ABC CORP.

DO NOT SIGN / WRITE / STAMP BELOW THE LAST

▲031000011▼
FIRST NATL SVC-013
DALLAS, TX #1012002
7815830233

00 2- NVT

[031000011]  01/02/2000
7815830233

METHOD AND SYSTEM FOR RETAINING MICR CODE FORMAT

TECHNICAL FIELD

This invention relates to check processing and, more specifically, to a method and system for retaining Magnetic Ink Character Recognition (MICR) code format.

BACKGROUND

Currently, the bank of first deposit receives a physical check from the point-of-sale (or point-of purchase), with the physical check including a Magnetic Ink Character Recognition (MICR) code. The MICR code comprises fields of numbers and characters found on the physical check (normally including the check number, account number, and routing number for example) that are printed using magnetic ink—occasionally, the physical MICR code includes dashes and spaces between some or all of the fields. Using this MICR code, the bank processes the check using any suitable technique and communicates the physical check to the recipient (or payor) bank for storage or forwarding to the appropriate account holder. For example, the checks are typically sorted according to payor bank, bundled together, and physically shipped to the receiving bank. This physical handling of checks and other commercial paper transactions requires large amounts of labor, costs, and storage space and is subject to various threats. But the Check Clearing for the 21st Century Act, commonly referred to as "Check 21," federally mandates that recipient banks must now accept electronic images of checks from other banks, thereby reducing costs and physical threats and increasing efficiency. Each electronic image may then be printed to generate an image replacement document, which is the legal equivalent of a physical check.

SUMMARY

This disclosure provides a system and method for retaining Magnetic Ink Character Recognition (MICR) code data. In certain embodiments, for example, an image capture system for retaining Magnetic Ink Character Recognition (MICR) code format comprises a camera operable to generate an electronic check image of a physical check, with the electronic check image operable to generate an image replacement document. The image capture system further comprises a scanner operable to identify MICR code data from the physical check and one or more processors. The one or more processors are operable to embed the identified MICR code data in the electronic check image, with the embedded MICR code data in the original format. The one or more processors may also embed truncated MICR code data in the electronic check image, with the truncated MICR code data comprising a portion of the identified MICR code data.

In other embodiments, software for retaining MICR code format is operable to identify MICR code data from a physical check and generate an electronic check image of the physical check, with the electronic check image operable to generate an image replacement document. The example software is further operable to embed the identified MICR code data in the electronic check image, with the embedded MICR code data in the original format. In further embodiments, the software is further operable to archive the electronic check image into an archive file, with the archive file comprising a header, a front image in black/white, a front image in grayscale, a back image in black/white, and a back image in grayscale. In still further embodiments, the electronic check image comprises a Tag Image File Format (TIFF). In another embodiment, the software is communicably coupled with a sorter control application.

The details of one or more embodiments of the invention are set forth in the accompanying drawings and the description below. One or more embodiments of the invention may include several important technical advantages. For example, retaining the original format of the MICR code allows an image replacement document (or IRD) to display the captured MICR code in the original format. In another example, the described embodiments may allow other systems to process the electronic check image using an expected truncated MICR code or the MICR in the original format as desired. Of course, various embodiments of the invention may have none, some or all of these advantages. Other features, objects, and advantages of the invention will be apparent from the description and drawings, as well as from the claims.

DESCRIPTION OF DRAWINGS

FIGS. 3A-B illustrate one embodiment of an electronic check image in the form of an image replacement document.

DETAILED DESCRIPTION

Figure 1:
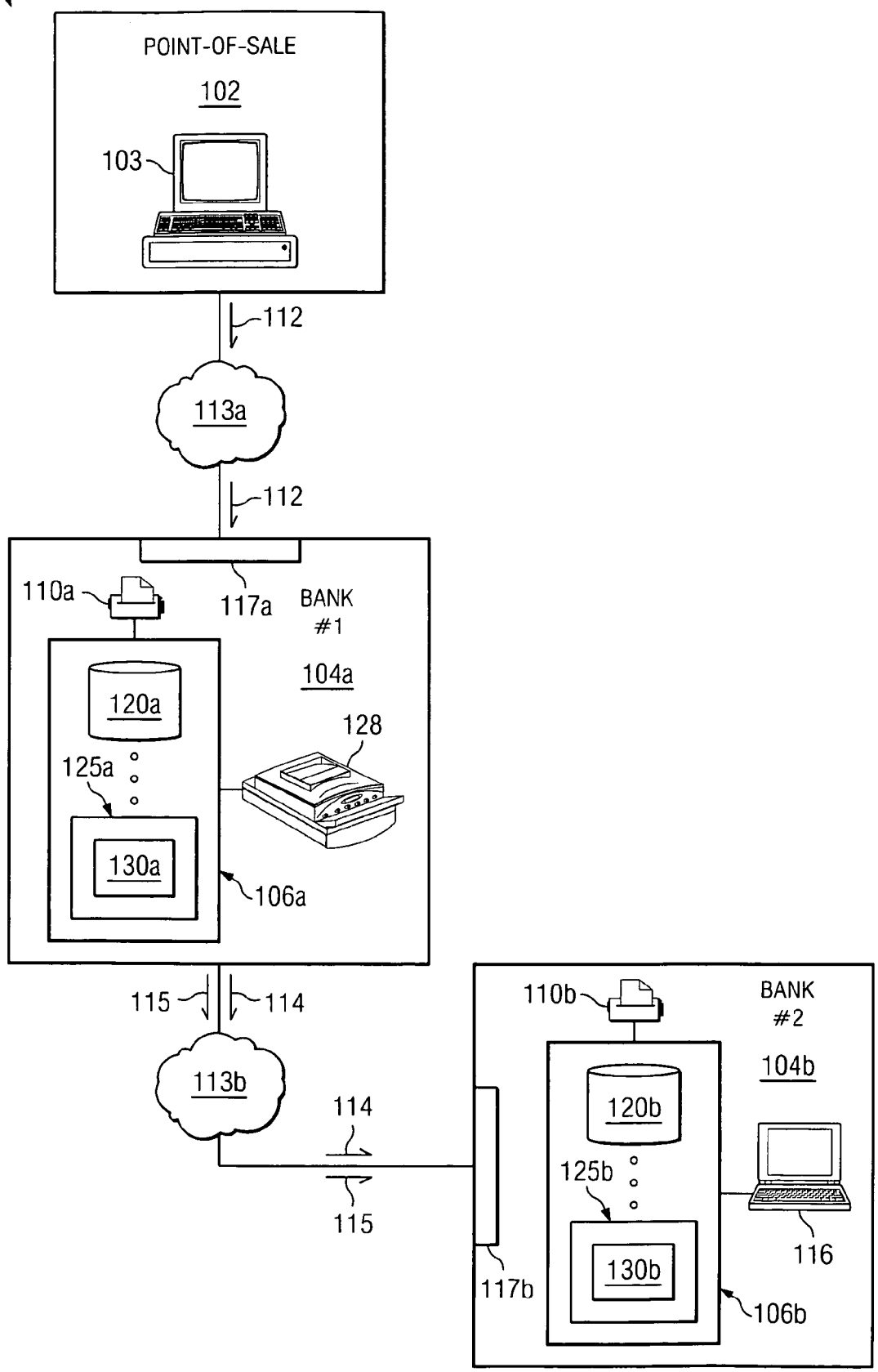
FIG. 1 illustrates a system for retaining MICR code format in accordance with one embodiment of the present disclosure.

FIG. 1 illustrates a system 100 for communicating and processing electronic check images 114 including the originally formatted Magnetic Ink Character Recognition (MICR) code or MICR data 115 in accordance with one embodiment of the present disclosure. Generally, system 100 includes at least a portion of any financial or banking system operable to process commercial paper transactions (such as checking), generate at least one electronic check image 114 associated with an image replacement document (IRD) for at least a particular one of the transactions, and identify or capture, process, communicate, and/or archive the MICR code 115 in its original format. For example, system 100 may receive a physical check at a receiving entity 102, capture an electronic image 114 and MICR data 115 (often termed a MICR code or a MICR line) from the check at a first financial institution 104, and embed the captured MICR data 115 in the original format, as well as a truncated format. The embedded MICR code may then be archived in a repository or archive 220 (as in FIG. 2) for subsequent viewing and processing in its original format. In certain embodiments, the embedded MICR code (in its original format) may be communicated to a second financial institution 104.

It will be understood that each check's MICR data 115 may be in any appropriate format including E13-B, CMC-7, output from Optical Character Recognition (OCR), as well as others (including other standards, versions, formats, or ink types). MICR data 115 typically includes a plurality of fields including routing/transit field, account field, serial field, and others. For example, MICR data 115 may include an auxiliary on-us field, a routing/transit number, an on-us field, a check number, and an amount field. The auxiliary on-us field is typically a check number used for commercial or corporate checks. The routing/transit number typically indicates i) the Federal Reserve District from which the transaction should be cleared; ii) the Federal Reserve Bank or Branch serving the area where the recipient financial institution 104 is located; and iii) identifies the number assigned to the recipient financial institution 104 by the American Bankers Association. The on-us field (or account number and serial number fields) includes the check writer's account number at the payee financial institution 104 and, in the case of personal checks, may include the check number. The amount field includes the MICR version of the transaction amount and is normally encoded by the financial institution 104 of first deposit. It will be understood that the described fields are for example purposes only and one or more these fields may not be captured without departing from the scope of this disclosure. Typically, the MICR data 115 on each physical check is formatted according to one of a plurality of conventional or propriety standards that include, for example, dashes and spaces between some or all of the fields. In certain embodiments, the original and embedded MICR data 115 may differ slightly. For example, the identified MICR code 115 may comprise a plurality of fields with at least two of the fields separated by a dash and two of the fields (even one of the two dashed fields) separated by spaces, while the embedded MICR code data includes the plurality of fields and the dash without the spaces.

Returning to the illustrated embodiment, system 100 is typically (but not necessarily) distributed into at least one receiving entity (or point-of-sale) 102 and two or more financial institutions 104, illustrated as first and second financial institutions 104a and 106b. Often, system 100 is electronically inter-coupled, thereby allowing efficient communications among the various components. But system 100 may be a standalone processing environment, such as system 100 consisting of one financial institution 104 with a plurality of offices interconnected via an intranet, or any other suitable banking environment operable to dynamically retain MICR data 115 in its original format without departing from the scope of this disclosure. The term "dynamically," as used herein, generally means that certain processing is determined, at least in part, at runtime based on one or more variables. The term "automatically," as used herein, generally means that the appropriate processing is substantially performed by at least part of system 100. It should be understood that "automatically" further contemplates any suitable user or manager interaction with system 100 without departing from the scope of this disclosure.

Receiving entity 102 is any recipient or payee of the checking or other commercial paper transaction. Receiving entity 102 may be a store, an online vendor, a telephony system, or others. Receiving entity 102 may also represent a teller at one of the financial institutions 104 without departing from the scope of the disclosure. In the illustrated embodiment, receiving entity 102 includes a cash register 103 for receiving and storing physical checks 112. Of course, receiving entity 102 may include other additional or alternative components for processing transactions. For example, receiving entity 102 may include a scanner and/or a computer for processing an example check or electronic payment. While not illustrated, the point-of-sale computer may also include or execute a portion or a copy of check processing engine 130 (illustrated in servers 106a and 106b) for performing or implementing MICR capture or other check processing without departing from the scope of the disclosure. Receiving entity 102 may also be operable to generate an Automated Clearing House (ACH) transaction based on the checking transaction for quickly processing the transaction with financial institutions 104. Regardless, at any appropriate time and using any suitable automatic or manual technique, receiving entity 102 communicates the checks to a first financial institution 104 for subsequent processing.

Figure 2:
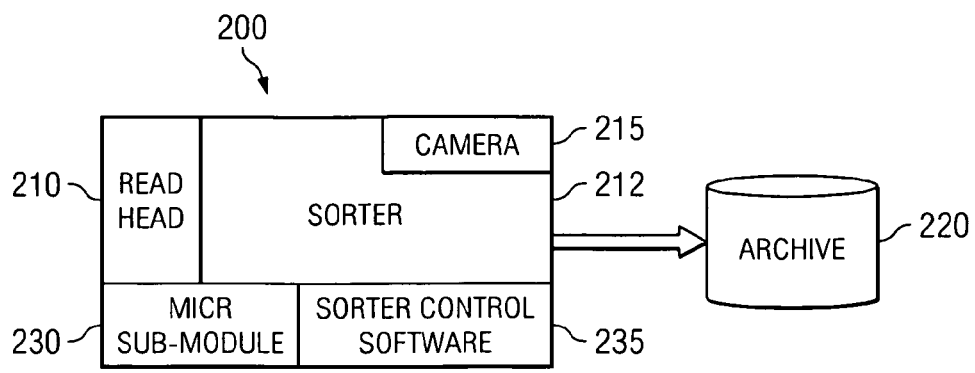
FIG. 2 illustrates an example image capture system for use by one of the entities in FIG. 1 to generate the electronic check image with embedded MICR data.

Financial institution 104 is any agent, third-party resource, clearing house, branch, processing center, or central office of a financial institution. Indeed, while illustrated as two banks, first financial institution 104a and second financial institution 104b respectively, any number of banks and/or other institutions may be included in system 100 without departing from the scope of this disclosure. Moreover, two or more financial institutions 104 may represent two or more routing/transit numbers associated with one institution. In other words, each financial institution 104 may have the same, similar, or distinct components from illustrated financial institutions 104. Returning to the illustrated embodiment, each financial institution 104 includes server 106, printer 110, and scanner 128. Printer 110 is any device operable to generate a hard copy from an electronic image. For example, financial institution 104 may include a plurality of checks or other commercial paper transactions in electronic form, which may then printed as image replacement documents (IRDs) using printer 110. These IRDs may then be considered a legal copy of the associated check. Scanner 128 is any suitable device operable to capture or otherwise obtain information from the received physical transactions, such as the checks from receiving entity 102. For example, scanner 128 may be a scanner, a sorter, an image capture system 200 (as illustrated in FIG. 2) or any other similar device (or combination thereof) including a digital camera for recording or generating electronic images 114 of the checks and a MICR reader for capturing MICR data 115 from the checks. The example digital camera may record an electronic check image 114 of the front and back of each check in black and white, grayscale, and/or color. As used herein, electronic check image 114 may be a digital image or file of the check including the front, the back, both, or any suitable portion thereof. This check image 114 may be in any suitable format including Moving Picture Experts Group (MPEG), Joint Photographic Experts Group (JPEG), Tag Image File Format (TIFF), including any suitable version thereof (such as TIFF 6.0), CIM, and others. For example, the TIFF file may include one or more tagged fields that may be customized or used for MICR data 115. In certain embodiments, electronic check image 114 may be stored in a file that includes a data or image header, a front image in black/white, a front image in grayscale, a back image in black/white, and a back image in grayscale. The MICR reader may capture or generate MICR data 115 in its original format, which is a plurality of fields including routing/transit field, account field, serial field, and others separated by spaces and/or dashes.

Banking server 106 includes memory 120 and processor 125 and comprises an electronic computing device operable to receive, transmit, process, and store data associated with system 100 and, more specifically, associated financial institution 104. For example, server 106 may be any computer or processing device such as, for example, a blade server, general-purpose personal computer (PC), Macintosh, workstation, a mainframe, or any other suitable device. Generally, FIG. 1 provides merely one example of computers that may be used with the disclosure. For example, although FIG. 1 illustrates one server 106 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. Server 106 may be adapted to execute any operating system including Linux, UNIX, Windows Server, or any other suitable operating system. According to one embodiment, server 106 may also include or be communicably coupled with a web server and/or a secure financial server.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes electronic check images 114, but memory 120 may include any appropriate data such as an audit log, account information, administration profiling, MICR data 115, one or more hash values, and others. For example, memory 120 may store electronic check images 114 in an object-oriented or a relational database, typically including tables defined using SQL statements and interrelated using schemas. In this example, one table may store electronic check images 114 and another table may store associated MICR data 115 in its original format and, when appropriate, the truncated format. In another example, memory 120 may store electronic check images 114 (with embedded MICR data 115) in text files, extensible Markup Language (XML) documents, Virtual Storage Access Method (VSAM) files, TIFF files, CIM files, flat files, Btrieve files, comma-separated-value (CSV) files, internal variables, one or more libraries, encrypted files, and others.

Server 106 also includes processor 125. Processor 125 executes instructions and manipulates data to perform the operations of server 106 such as, for example, a central processing unit (CPU), a blade, an application specific integrated circuit (ASIC), or a field-programmable gate array (FPGA). Although FIG. 1 illustrates a single processor 125 in server 106, multiple processors 125 may be used according to particular needs and reference to processor 125 is meant to include multiple processors 125 where applicable. In the illustrated embodiment, processor 125 executes check processing engine 130, which captures MICR data 115 for its original format for electronic check images 114 and subsequent processing.

Check processing engine 130 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. Generally, check processing engine 130 is any module, sub-module, subroutine, or process operable to, among other things, automatically capture and store MICR data 115 in its original format. It will be understood that while check processing engine 130 is illustrated in FIG. 1 as a single multi-tasked module, the features and functionality performed by this engine may be performed by multiple modules such as in FIG. 2, for example, or an image generation module, a check processing module, and an administration module. Further, while illustrated as internal to server 106, one or more processes associated with check processing engine 130 may be stored, referenced, accessed, or executed remotely (such through receiving entity 102). Moreover, check processing engine 130 may be a child or sub-module of another software module (not illustrated) without departing from the scope of this disclosure. In one embodiment, check processing engine 130 may include or be communicably coupled with an administrative workstation or graphical user interface (GUI) 116. For example, the workstation may comprise a computer that includes an input device, such as a keypad, touch screen, mouse, or other device that can accept information, and an output device that conveys information associated with the operation of server 106 or receiving entity 102, including digital data, visual information, or GUI 116. Both the input device and output device may include fixed or removable storage media such as a magnetic computer disk, CD-ROM, or other suitable media to both receive input from and provide output to users through the display, namely GUI 116.

GUI 116 comprises a graphical user interface operable to allow the user of the workstation to interface with at least a portion of system 100 for any suitable purpose. Generally, GUI 116 provides the user of the workstation with an efficient and user-friendly presentation of data provided by or communicated within system 100. GUI 116 may comprise a plurality of customizable frames or views having interactive fields, pull-down lists, and buttons operated by the user. In one embodiment, GUI 116 presents reports that includes the various processed check information and associated buttons and receives commands from the user via one of the input devices. In an alternative embodiment, GUI 116 may be hidden or not implemented. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 106 can accept data from the workstation via the web browser (e.g., Microsoft Internet Explorer or Netscape Navigator) and return the appropriate HTML or XML responses using network 113.

Server 106 may also include interface 117 for communicating with other computer systems or components, such as other server 106 or receiving entity 102, over network 113 in a client-server or other distributed environment. In certain embodiments, server 106 receives electronic images 114 of checks from internal or external senders through interface 117 for storage in memory 120 and/or processing by processor 125. Generally, interface 117 comprises logic encoded in software and/or hardware in a suitable combination and operable to communicate with network 113. More specifically, interface 117 may comprise software supporting one or more communications protocols associated with communications network 113 or hardware operable to communicate physical signals.

Network 113 facilitates wireless or wireline communication between computer servers 106 and any other local or remote computer or component, such as all or a portion of a bank posting system or other intermediate systems. Indeed, while illustrated as two networks, 113a and 113b respectively, network 113 may be a continuous network without departing from the scope of this disclosure, so long as at least portion of network 113 may facilitate communications between the requisite parties or components. In other words, network 113 encompasses any internal or external network, networks, sub-network, or combination thereof operable to facilitate communications between various computing components in system 100. Network 113 may communicate, for example, Internet Protocol (IP) packets, Frame Relay frames, Asynchronous Transfer Mode (ATM) cells, voice, video, data, and other suitable information between network addresses. Network 113 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation receiving entity 102 receives a physical check 112 from a buyer or other payer. After any suitable processing, receiving entity 102 communicates at least this check to first financial institution 104a. For example, receiving entity 102 may collect checks throughout a day or week and communicate these gathered checks to first financial institution 104a in a bundle. Once first financial institution 104a receives the physical checks, it generates an electronic check image 114 for each check using, for example, scanner 128. Often concurrently, first financial institution 104a also captures MICR data 115 from each check. First financial institution 104a may also sort the electronic images 114 and MICR data 115 according to recipient bank (illustrated as second financial institution 104b). In this way, first financial institution 104a may parse out or otherwise collect the electronic data for communication to the appropriate recipient financial institution 104b. First financial institution 104a, using check processing engine 130, then embeds the MICR data 115 in the electronic check image 114 using any suitable technique. For example, check processing engine 130 may add the original MICR data in its original format into the DocumentName field in a TIFF file or insert the data into another field and tag it appropriately. Continuing this example, check processing engine may also insert the truncated version of the MICR data 115 (without the formatting or as a hash value) into a similar field.

First financial institution 104a then sends the appropriate electronic check images 114 to recipient financial institution 104b for processing. As described above, these electronic check images 114 are each operable generate an IRD, thereby reducing or eliminating the need for shipping the physical checks. For example, first financial institution 104 may communicate electronic check images 114 to an office local to recipient financial institution 104a. The local office may print a plurality of IRDs from the received electronic images 114 and provide the IRDs to the recipient financial institution 104b. Continuing the example, the local office then forwards the electronic check images 114 to the recipient financial institution 104b at any later time. In another example, server 106a may communicate electronic check images 114 to recipient financial institution 104b via network 113. However obtained, recipient financial institution 104b is then operable to generate the IRD with the MICR code 115 in the original format, including spaces, dashes, and such.

FIG. 2 illustrates an example image capture system 200 for retaining MICR code format in accordance with one embodiment of the present disclosure. For example, image capture system 200 may be a large check sorter at a financial institution 104. Illustrated image capture system 200 includes a read head 210 or scanner, a sorter 212, and a camera 215. System 200 may include a processor for each of these components, a processor from all of these components, or any combination thereof, so long as system 200 is operable to execute software, firmware, and/or other local or remote logic. For example, these components are managed or are communicably coupled with one or both of MICR subroutine 230 and sort control software 235. It will be understood that reference to check processing engine 130 may include MICR subroutine 230 alone or in combination with sort control software 235. Once image capture system 200 scans check 112 and generates electronic check image 114 with embedded MICR data 115, it archives the data in archive 220.

Archive 220 is any intra-bank, inter-bank, regional, or nationwide or substantially national electronic storage facility, data processing center, or archive that allows for one or a plurality of financial institutions 104 (as well as receiving entities 102) to store MICR data 115 in its original format for subsequent access or processing. For example, archive 220 may be a central database communicably coupled with points-of-sale 102 and financial institutions 104. In another example, archive 220 may be a tape backup of captured MICR codes 115. Regardless, archive 220 may include, store all or part of, or otherwise reference archived MICR data 115 in any appropriate storage format. For example, archive 220 may store MICR data 115 as one or more tables stored in a relational database described in terms of SQL statements or scripts. In this example embodiment, each record may be associated with a particular truncated or hashed MICR code or line as the primary key, with the MICR code in its original format as a related field. The primary key allows for quick access and location. In another embodiment, the one or more MICR codes may be stored or defined in various data structures as text files, XML documents, VSAM files, TIFF files, CIM files, flat files, Btrieve files, CSV files, internal variables, or one or more libraries. In short, archive 220 may comprise one table or file or a plurality of tables or files stored on one computer or across a plurality of computers in any appropriate format. Moreover, archive 220 may be physically or logically located at any appropriate location including in one of the financial institutions 104 or off-shore, so long as it remains operable to store archived images 114 and/or MICR data 115 associated with a plurality of transactions.

FIGS. 3A-B illustrate one embodiment of an image replacement document 300 from an example electronic check image 114. At a high level, FIG. 3A illustrates the front image 300a of a check 302, while FIG. 3B illustrates the back image 300b of check 302 used by the system of FIG. 1. In this embodiment, check 302 is illustrated as a portion of an IRD 300, which may be considered a legal representation of transaction 302. Transaction 302 is associated with two MICR codes 304 and 306, each generated or captured at different points during transaction processing. For example, MICR code 304 may be preprinted on the check prior to the actual transaction. In this example, MICR code 304 includes an item type indicator of "1," a routing number or field 5 of "12345," an account number of "12345678," and a check number of "101." In this example, MICR code 304 has been supplemented with the captured amount, "100.00," perhaps at the receiving entity 102 or the financial institution 104 of first deposit. MICR code 306 is substantially similar to MICR code 304, with the difference involving the item type indicator. In MICR code 304, the item type indicator is "1", while MICR code 306 includes an item type indicator of "4." FIG. 3B illustrates a back portion of IRD 300. This portion of IRD 300 includes various processing, authorization, and deposit data. For example, the back of the check includes the financial institution 104 of first deposit, namely "First National Bank." The back of the check further describes the date of first deposit, item sequence number, and any endorsement, in this case a stamp of "For Deposit Only."

Figure 4:
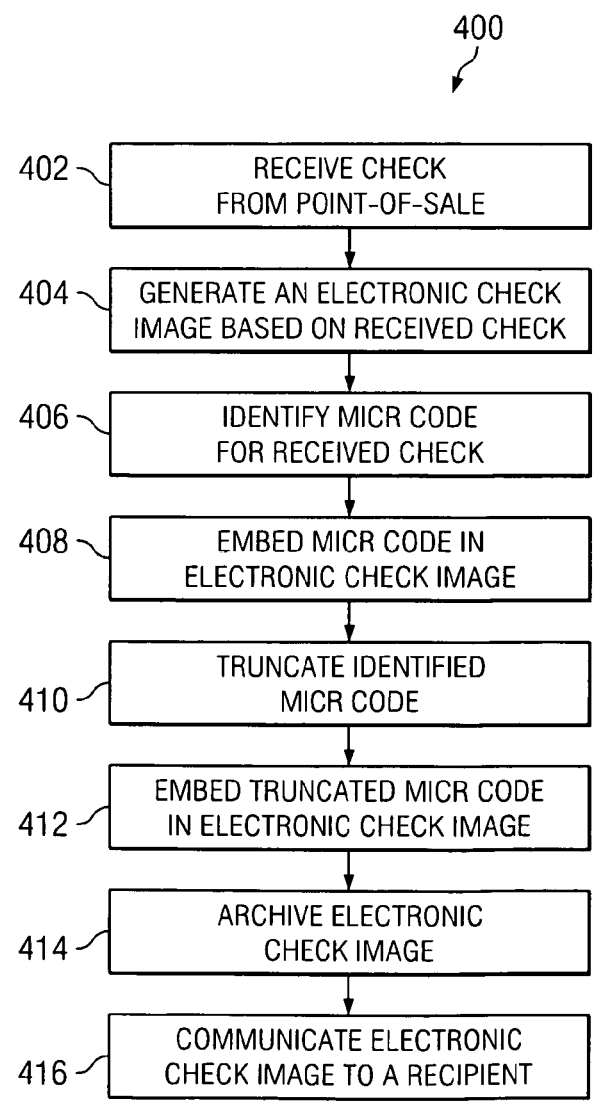
FIG. 4 is a flowchart illustrating an example method for retaining MICR code format in accordance with one embodiment of the present disclosure.

FIG. 4 is a flowchart illustrating an example method 400 for retaining original MICR formatting in accordance with one embodiment of the present disclosure. At a high level, method 400 includes first financial institution 104 generating an electronic image 114 and capturing the original MICR code 115, archiving at least the original MICR code 115, and communicating both electronic data items to a second financial institution 104b, thereby allowing first financial institution 104a and the recipient to generate an image replacement document with the MICR code 115 in the original format. The following description focuses on the operation of a particular check processing engine 130 in performing this method. But system 100 contemplates using any appropriate combination and arrangement of logical elements implementing some or all of the described functionality.

Method 400 begins at step 402, where first financial institution 104a receives a physical check 112 from receiving entity 102. Of course, first financial institution 104a may also receive physical check 112 from any other appropriate component or institution. Next, first financial institution 104 generates an electronic image 114 based on received check 112 such as, for example, using scanner 128 at step 404. This electronic image 114 may comprise four images including a front image in black/white, a front image in grayscale, a back image in black/white, and a back image in grayscale. At step 406, first financial institution 104a captures or otherwise identifies MICR data 115 for received check 112. For example, first financial institution 104a may include scanner 128 with a digital camera operable to capture MICR data 115 from physical check 112. Next, check processing engine 130a embeds the identified MICR data 115 in electronic check image 114 using the original format at step 408. As described above, this format typically includes any dashes, spaces, or other spatial or character formatting that are physically printed or located on check 112. The original MICR data 115 may be embedded in the image header, in a constituent field of one of the constituent images, or in any other appropriate logical location. At step 410, check processing engine 130a truncates the identified MICR data 115 using any suitable technique. For example, check processing engine 130a may remove any dashes or spaces, may hash the MICR code 115 to conserve space or for security, or may generate some other representation of the MICR data 115. In certain embodiments, check processing engine 130a then embeds the truncated version of MICR data 115 in electronic check image 114, as shown step 412. Next, at step 414, check processing engine 130a archives the electronic check image 114, which now includes MICR data 115. According to certain embodiments, check processing engine 130a may generate or store a local copy of electronic check image 114 in memory 120. For example, check processing engine 130a may store the local copy in an audit record or log in memory 120a. In another example, check processing engine 130a may communicate a copy of electronic check image 114 to a data storage repository or archive 220. At step 416, check processing engine 130a communicates electronic check image 114 and the associated MICR data 115 to a recipient financial institution 104b, illustrated in FIG. 1, also termed second financial institution 104b.

The preceding flowchart and accompanying description illustrate exemplary method 400. In short, system 100 contemplates using any suitable technique for performing this and other tasks. Accordingly, many of the steps in this flowchart may take place simultaneously and/or in different orders than as shown. Moreover, system 100 may use methods with additional steps, fewer steps, and/or different steps, so long as the methods remain appropriate. For example, it will be understood that the truncation and the embedding of the truncated MICR data may not performed in certain embodiments.

Although this disclosure has been described in terms of certain embodiments and generally associated methods, alterations, and permutations of these embodiments and methods will be apparent to those skilled in the art. For example, the electronic check image may include only the original MICR data, without the truncated version, as appropriate for particular recipients or archive systems. In this example, if the truncated data was previously stored, the MICR data in its original format could be stored in an area that is used to store the truncated MICR data (original MICR inside an area of the truncated MICR as it were) using an optional compression technique. In another example, the check processing engine may store the original MICR code in a separate file or record for bundling with the electronic check image. In yet another example, while termed "original," the described components and techniques may be used to retain modified MICR formatting as well—indeed, the components and techniques may be used to store different iterations of the MICR code using different formats during processing of the check or its image. Accordingly, the above description of example embodiments does not define or constrain this disclosure. Other changes, substitutions, and alterations are also possible without departing from the scope of this disclosure.

What is claimed is:

1. A method for retaining Magnetic Ink Character Recognition (MICR) code format in an electronic check image comprising:

identifying MICR code data from a physical check;

generating an electronic check image of the physical check, the electronic check image operable to generate an image replacement document; and embedding the identified MICR code data in the electronic check image, the embedded MICR code data in the original format.

2. The method of claim 1, further comprising archiving the electronic check image into an archive file, the archive file comprising a header, a front image in black/white, a front image in grayscale, a back image in black/white, and a back image in grayscale.

3. The method of claim 2, further comprising compressing the archive file using an unsigned packed technique.

4. The method of claim 1, the identified MICR code comprising a plurality of fields and at least two of the fields separated by a dash.

5. The method of claim 1, the electronic check image comprising a Tag Image File Format (TIFF).

6. The method of claim 1, further comprising embedding truncated MICR code data in the electronic check image, the truncated MICR code data comprising a representation of the identified MICR code data.

7. Software for retaining Magnetic Ink Character Recognition (MICR) code format in an electronic check image, the software comprising computer executable instructions embodied on computer-readable storage media and operable to:

identify MICR code data from a physical check;

generate an electronic check image of the physical check, the electronic check image operable to generate an image replacement document; and embed the identified MICR code data in the electronic check image, the embedded MICR code data in the original format.

8. The software of claim 7, further operable to archive the electronic check image into an archive file, the archive file comprising a header, a front image in black/white, a front image in grayscale, a back image in black/white, and a back image in grayscale.

9. The software of claim 8, further operable to compress the archive file using an unsigned packed technique.

10. The software of claim 7, the identified MICR code comprising a plurality of fields and at least two of the fields separated by a dash.

11. The software of claim 7, the electronic check image comprising a Tag Image File Format (TIFF) file.

12. The software of claim 11, wherein the software operable to embed the identified MICR code data in the electronic check image comprises the software operable to embed the identified MICR code data in a TIFF "DocumentName" field of the TIFF file.

13. The software of claim 7, further operable to communicate the electronic check image to a recipient, the recipient operable to generate the image replacement document with the identified MICR code using the electronic check image and the embedded identified MICR code data.

14. The software of claim 7, the software communicably coupled with a softer control application.

15. The software of claim 7, the software further operable to embed truncated MICR code data in the electronic check image, the truncated MICR code data comprising a representation of the identified MICR code data.

16. An image capture system for retaining Magnetic Ink Character Recognition (MICR) code format in an electronic check image comprising:
- a camera operable to generate an electronic check image of a physical check, the electronic check image operable to generate an image replacement document;
- a scanner operable to identify MICR code data from the physical check; and
- one or more processors operable to embed the identified MICR code data in the electronic check image, the embedded MICR code data in the original format.

17. The system of claim 16, the one or more processors further operable to archive the electronic check image into an archive file, the archive file comprising a header, a front image in black/white, a front image in grayscale, a back image in black/white, and a back image in grayscale.

18. The system of claim 17, the one or more processors further operable to compress the archive file using an unsigned packed technique.

19. The system of claim 15, the identified MICR code comprising a plurality of fields and at least two of the fields separated by a dash.

20. The system of claim 15, the electronic check image comprising a Tag Image File Format (TIFF).

21. The system of claim 15, the one or more processors further operable to embed truncated MICR code data in the electronic check image, the truncated MICR code data comprising a representation of the identified MICR code data.

22. A method for retaining Magnetic Ink Character Recognition (MICR) code format comprising:
- identifying MICR code data from a physical check, the identified MICR code comprising a plurality of fields and at least two of the fields separated by a dash and two of the fields separated by spaces;
- generating an electronic check image of the physical check, the electronic check image operable to generate an image replacement document;
- embedding the identified MICR code data in the electronic check image, the embedded MICR code data including the plurality of fields and dash; and
- archiving the electronic check image into an archive file.

* * * * *

UNITED STATES PATENT AND TRADEMARK OFFICE
CERTIFICATE OF CORRECTION

| | | |
|---|---|---|
| PATENT NO. | : 7,447,347 B2 | Page 1 of 1 |
| APPLICATION NO. | : 11/060655 | |
| DATED | : November 4, 2008 | |
| INVENTOR(S) | : Christopher S. Weber | |

It is certified that error appears in the above-identified patent and that said Letters Patent is hereby corrected as shown below:

In column 11, claim 14, line 12 – replace "softer" with -- sorter --

Signed and Sealed this

Tenth Day of February, 2009

JOHN DOLL
*Acting Director of the United States Patent and Trademark Office*